United States Patent [19]

Nobbe

[11] 3,982,874

[45] *Sept. 28, 1976

[54] PRODUCTION LINE APPARATUS FOR PRODUCING CONCRETE FLOORS

[76] Inventor: Paul J. Nobbe, R.R. 2, Brookville, Ind. 47012

[*] Notice: The portion of the term of this patent subsequent to Oct. 28, 1992, has been disclaimed.

[22] Filed: Mar. 27, 1975

[21] Appl. No.: 562,652

[52] U.S. Cl. ............................... 425/424; 193/35 R; 249/142; 425/88; 425/439; 425/453; 425/456
[51] Int. Cl.² ........................................ B28B 5/04
[58] Field of Search .... 425/424, 432, 439, 453–454, 425/456, 88, DIG. 200–201; 193/35 R; 198/237–238, 240–241, 278–285; 249/137, 142, 145, 148–149, 168–169, 134

[56] References Cited
UNITED STATES PATENTS

| | | | |
|---|---|---|---|
| 1,506,047 | 8/1924 | Bryan et al. | 198/286 |
| 1,668,118 | 5/1928 | Mayone | 425/439 |
| 1,771,473 | 7/1930 | Westrip | 198/127 |
| 2,929,489 | 3/1960 | Parrish | 198/280 |
| 3,032,850 | 5/1962 | Russell | 425/432 |
| 3,553,798 | 1/1971 | Reckman et al. | 425/126 |
| 3,577,610 | 5/1971 | Margolin et al. | 425/432 |
| 3,659,986 | 5/1972 | Gelbman | 425/432 |
| 3,739,050 | 6/1973 | Kowcz et al. | 425/88 |

Primary Examiner—Robert D. Baldwin
Assistant Examiner—John McQuade
Attorney, Agent, or Firm—Woodard, Weikart, Emhardt & Naughton

[57] ABSTRACT

Production line apparatus for producing concrete floors. A table for supporting a concrete receiving mold is movably mounted atop a frame. Shaking means connected to and between the frame and the table shake the table settling the concrete within the mold. A pair of conveyors extend from the table to convey the mold from the table. The conveyors extend over the table but beneath the mold supporting surfaces provided on the table. The conveyors are lifted upward against the mold lifting the mold from the table. A mold turning over device is positioned at one end of the conveyors and is operable to receive the mold and to turn the mold upside-down repositioning the mold atop a second pair of conveyors. A hoist extends over the second pair of conveyors and is operable to lift the mold upwardly leaving the solidified concrete floor atop the second pair of conveyors. The mold is lifted and positioned between a pair of spaced apart return conveyors which extend back toward the shaker table. The return conveyors twist about a return axis until the mold is repositioned right-side-up.

11 Claims, 9 Drawing Figures

PRODUCTION LINE APPARATUS FOR PRODUCING CONCRETE FLOORS

BACKGROUND OF THE INVENTION

1. Field of the Invention

This invention is in the field of devices for producing concrete floors.

2. Description of the Prior Art

Concrete slabs are used in animal pens to form slotted floors. The slabs are spaced apart to allow for the animal droppings to pass therethrough to a pit or ditch located beneath the floor. It is desirable for the concrete slabs to have a smooth top surface thereby allowing for the easy removal of the animal droppings from the slabs. In order to obtain the smooth top surface for each slab, I have provided a mold disclosed in my copending U.S. patent application, Ser. No. 457,068, now U.S. Pat. No. 3,915,422 wherein the slabs are poured upside-down. The mold is provided with a smooth bottom surface thereby forming a smooth top surface of the slabs which are simultaneously poured into an integral section.

Heretofore, a floor section composed of a plurality of slabs has been formed by manually filling and handling the mold. This method limits the number of floor sections pourable in a single day and provides for inefficiency. I have therefore provided a system for pouring a plurality of molds. The system disclosed herein allows for a far greater number of floor sections to be produced in a single day.

The molds are provided with open tops and as a result, the mold must first be turned over in order to remove the mold from the poured floor section. The mold when filled with concrete is exceptionally heavy therefore requiring a hoist or other device for lifting and turning the mold over. Disclosed herein is an automatic system for turning the mold over as the mold progresses down a conveyor line. Likewise, it is necessary to turn the mold right-side-up once the mold has been removed from the floor section. Disclosed herein is a return conveyor which rotates the mold to a right-side-up position. A shaker table is provided allowing for settling of the concrete within the mold.

SUMMARY OF THE INVENTION

One embodiment of the present invention is an apparatus placing concrete into molds producing concrete floors comprising a main floor, a table movably mounted on the frame and adapted to receive and support a mold having an open top, a source of flowable concrete positioned adjacent the table and having an outlet positioned over the mold directing concrete to flow from the source into the open top of the mold, shaking means connected to and between the frame and the table and operable to shake the table and mold settling concrete within the mold, first conveying means extending away from the table being sized to supportingly receive the mold and operable to convey the mold from the table to a first location, mold turning over means located at the first location being sized to supportingly receive the mold from the first conveying means and operable to turn the mold upside-down with the open top facing downwardly, and second conveying means extending from the first location back toward the table, the second conveying means being sized and positioned to supportingly receive the mold when the mold is upside-down and operable to turn the mold right-side-up with the open top facing upwardly.

It is an object of the present invention to provide an assembly line system for producing concrete slotted floors with molds.

A further object of the present invention is to provide a new and improved apparatus for producing concrete slotted floors.

Related objects and advantages of the present invention will be apparent from the following description.

DESCRIPTION OF THE PREFERRED EMBODIMENT

Figure 1:
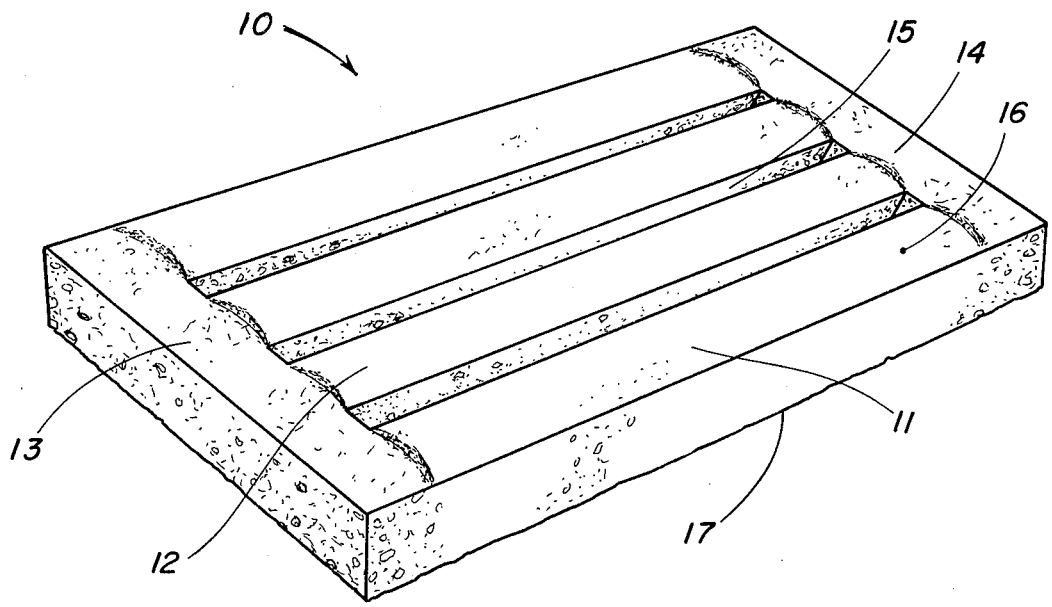
FIG. 1 is a perspective view of a concrete slotted floor.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Now referring more particularly to FIGS. 1 through 4, there is shown a concrete slotted floor 10 having a plurality of ribs 11 and 12 joined integrally together at their opposite ends 13 and 14 with the ribs separated apart by slots 15 extending completely through floor 10. The top surface 16 of the slotted floor is smooth to facilitate the cleaning of the floor. A similar floor is disclosed in my co-pending U.S. patent application, Ser. No. 457,068, Filed Apr. 1, 1974 now U.S. Pat. No. 3,915,422, which is hereby incorporated by reference.

Slotted floors 10 may be installed in a variety of animal pens. The slots in the floor are provided to facilitate the removal of the animal droppings which fall onto top surface 16. In many cases, the animal droppings do not fall through the slots and as a result, the floors must be cleaned periodically. The top surface of the floor is therefore smooth enabling the floor to be readily cleaned. The bottom surface 17 has a rough and uneven finish.

Figure 2:
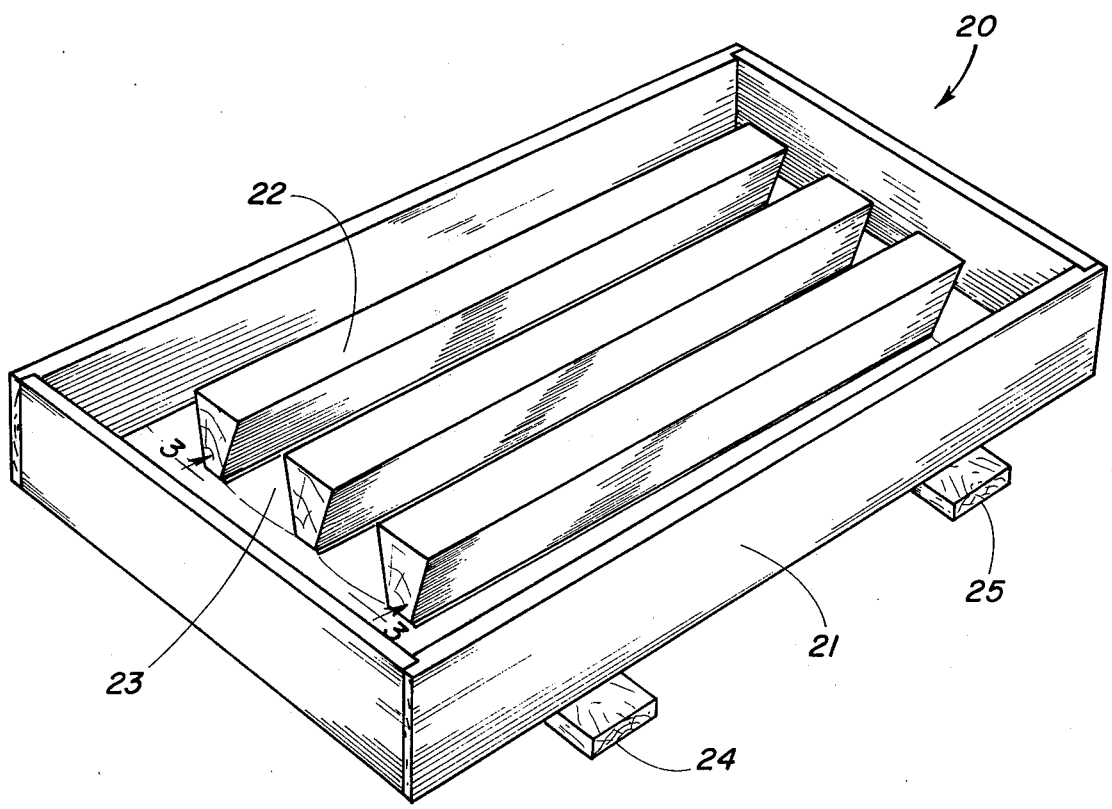
FIG. 2 is a perspective view of a mold for producing the concrete slotted floor of FIG. 1.
Figure 4:
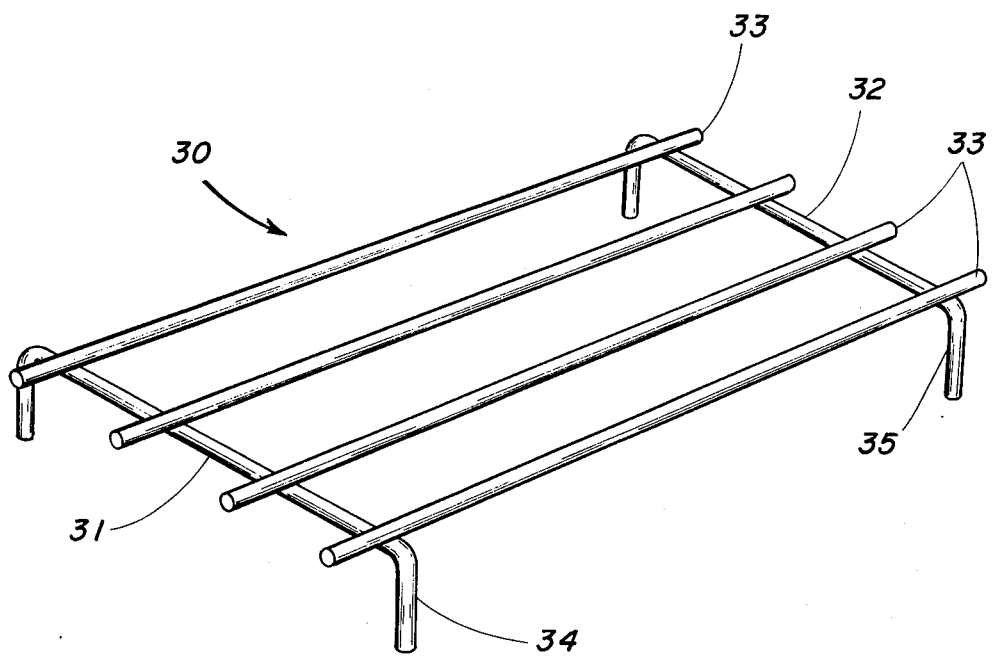
FIG. 4 is a perspective view of the metal framework within the concrete slotted floor of FIG. 1.
Figure 3:
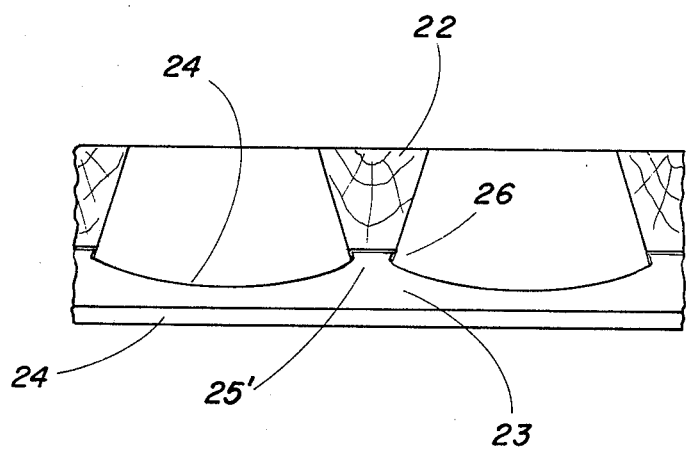
FIG. 3 is an enlarged fragmentary cross sectional view taken along the line 3—3 of FIG. 2 and viewed in the direction of the arrows.

FIG. 2 is a perspective view of a mold 20 for receiving poured concrete to produce the slotted floor of FIG. 1. Mold 20 is a four-sided box 21 having an open top and a closed bottom. A plurality of ribs 22 are mounted atop the floor 23 of the mold. Each rib 22 includes a spring biased clip 26 which is frictionally engaged with upstanding portion 25' (FIG. 3). The longitudinally extending side portions of clip 26 are biased against the opposite sides of upstanding portion 25'. In order to remove the ribs from the mold, upward force is applied to the ribs to disengage clips 26 from the upward portions 25'. A concave surface 24 is provided between the upraised portions 25' providing a rounded contour surface for each rib 11 and 12 (FIG. 1) of floor 10.

Prior to pouring the concrete into mold 20, a metal framework 30 is inserted into the mold. Framework 30 includes a pair of end metal rods 31 and 32. A plurality of horizontal rods 33 are fixedly attached to rods 31 and 32 and are spaced upwardly from the bottom floor of the mold by the downwardly turned legs 34 and 35 of rods 31 and 32. Metal framework 30 becomes an integral part of the slotted floor increasing the strength of the floor.

Figure 5:
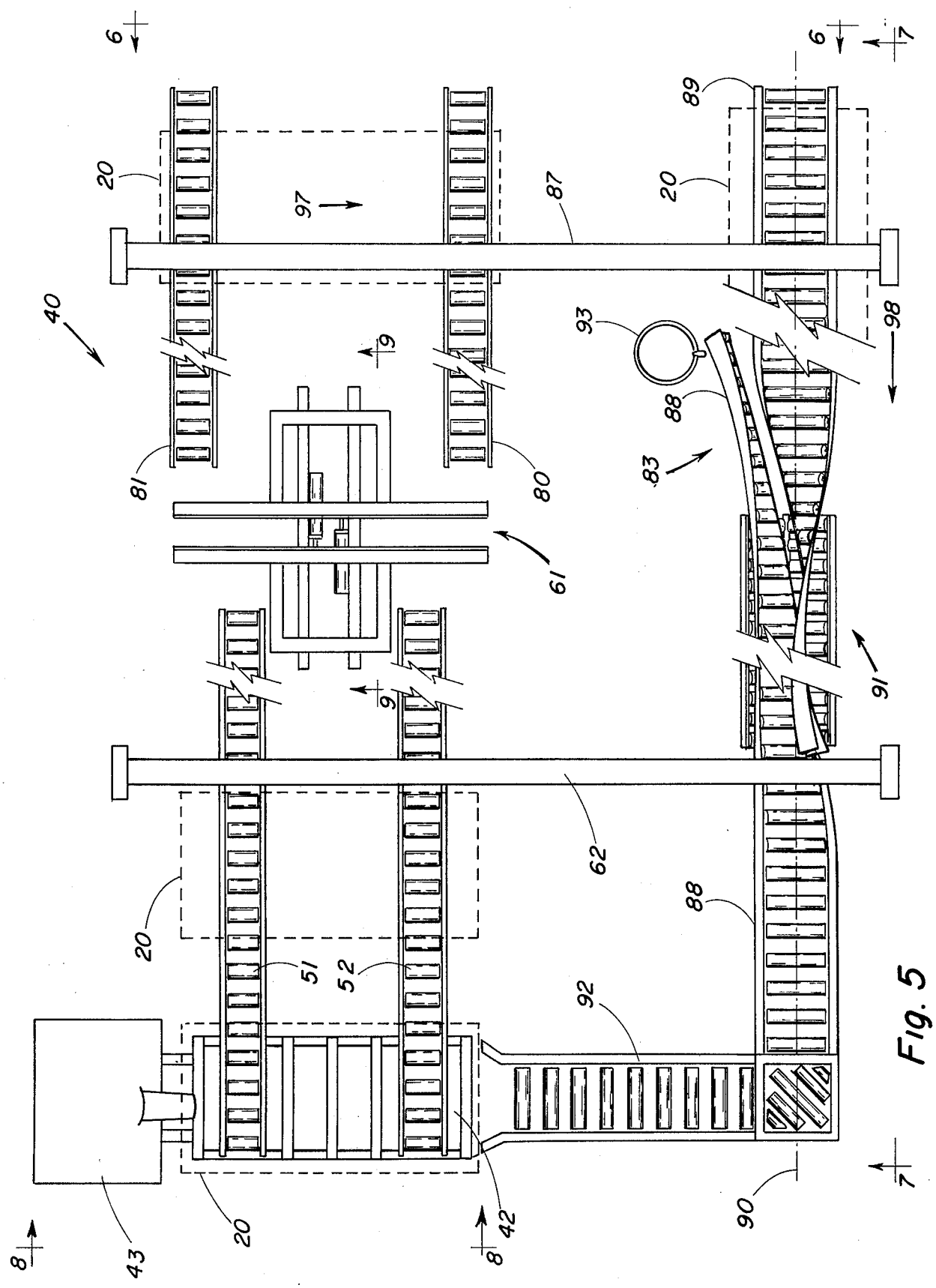
FIG. 5 is a plan view of an apparatus for producing the concrete slotted floor of FIG. 1 with the mold of FIG. 2.
Figure 8:
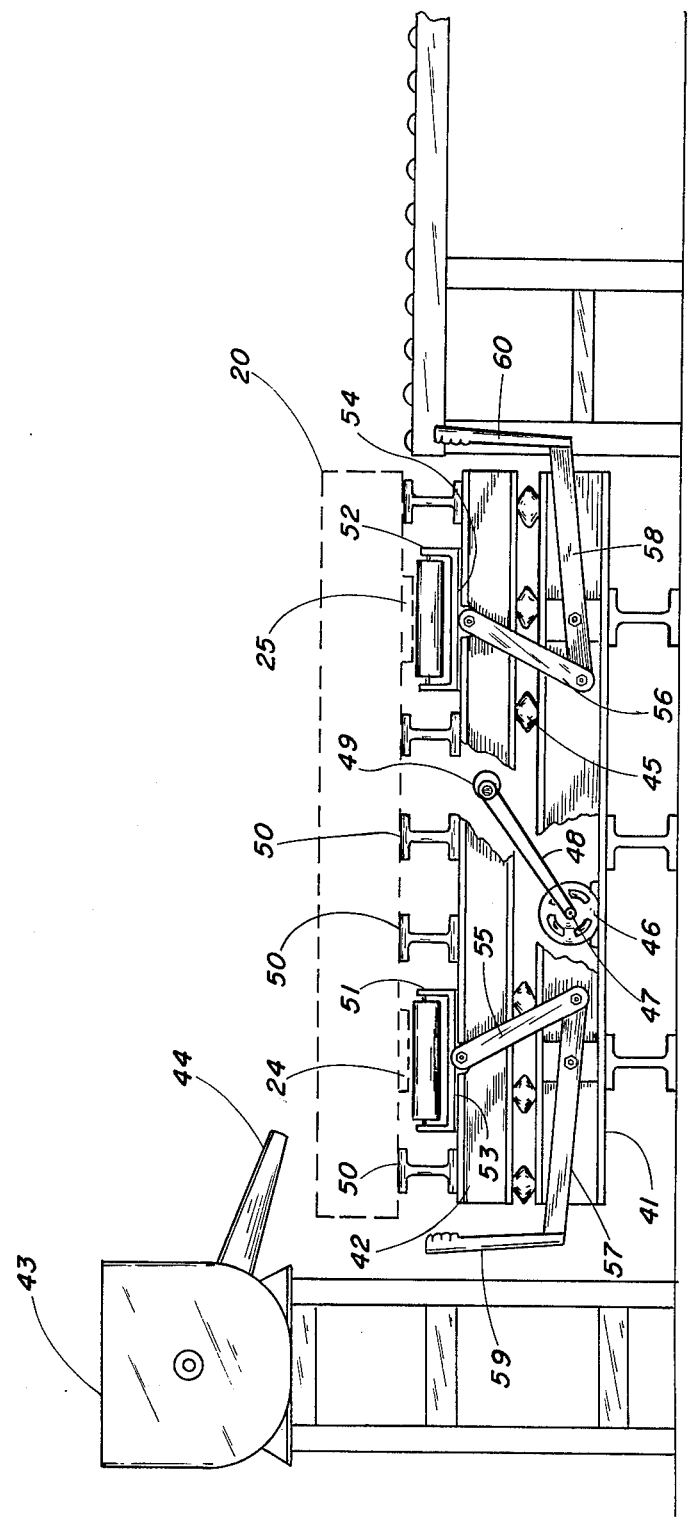
FIG. 8 is a fragmentary end view of the apparatus of FIG. 5 looking in the direction of arrows 8—8.

The apparatus 40 for producing the concrete slotted floors 10 with molds 20 is shown in FIG. 5. Apparatus 40 includes a main frame 41 (FIG. 8) with a table 42 movably mounted atop frame 41 and adapted to receive and support mold 20. A source 43 of flowable concrete is positioned adjacent table 42 having an outlet 44 extending over mold 20 so as to direct concrete to flow from the source and into mold 20 through the open top of the mold.

Table 42 is mounted atop frame 41 but is spaced therefrom by a plurality of flexible isolators 45 thereby allowing table 42 to shake apart from frame 41. A conventional electric motor 46 is mounted to frame 41 and has a rotatable output shaft 47 engaged with a conventional continuous belt 48. An eccentric 49 is rotatably mounted to table 42 and is also engaged with belt 48. Activation of motor 46 causes the rotatable output shaft 47 to rotate thereby driving belt 48 in turn causing rotation of eccentric 49 thereby imparting a shaking motion to table 42.

A plurality of upstanding rigid members 50 are fixedly mounted to and atop table 42 supporting mold 20. A pair of conventional roller conveyors 51 and 52 extend over table 42 but are located beneath the upper surface of supports 50 thereby insuring that roller conveyors 51 and 52 do not normally engage mold 20. The outer end portions of conveyors 51 and 52 rest atop platforms 53 and 54 respectively fixedly attached to arms 55 and 56. Arms 55 and 56 are respectively pivotally mounted to members 57 and 58 which are pivotally mounted to frame 41. A pair of pedals or handles 59 and 60 are respectively fixedly mounted to arms 57 and 58. Downward pressure to handles 59 and 60 results in platforms 53 and 54 being raised thereby causing conveyors 51 and 52 to support and engage mold 20. Thus, the operator may apply downward pressure to handles 59 and 60 in order to lift mold 20 off of the table and to allow the mold to then move in a direction away from the table.

A pair of runners 24 and 25 are fixedly attached to the bottom floor of mold 20 and are arranged to be slidingly supported by conveyors 51 and 52 when the conveyors are caused to move upwardly beyond the top supporting surface of supports 50.

Conveyors 51 and 52 (FIG. 5) extend approximately 160 feet from table 42 to the mold turning over device 61. As a result, consecutive molds may be filled with concrete continuously for a duration of approximately four hours until the molds are backed up from device 61 to table 42. In a four hour period with device 61 located approximately 160 feet away from table 42, approximately 80 molds of 4 slats each may be filled with concrete. A hoist 62 is provided for conveying the ribs 22 from the mold to a storage area. Only a short duration of time is required to allow the concrete to set sufficiently to enable removal of ribs 22 without destroying the structural integrity of the slotted floor. In order to remove the slotted floor from the mold, it is necessary to turn the mold upside-down allowing the slotted floor to move from the mold. The top smooth surface 16 (FIG. 1) of the slotted floor is initially in contact with the bottom floor 23 of the mold. Thus, the top surface of the slotted floor is automatically smooth and does not require subsequent finishing of the concrete. The bottom surface 17 of the mold, however, is rough since the concrete is not smoothed adjacent the open top side of the mold. It is unnecessary to provide a smooth bottom surface 17 of the concrete slotted floor since the bottom surface does not require cleaning when used in an animal pen. Device 61 is provided for turning the mold upside-down allowing the mold to be removed from the slotted floor and returned to the shaker table for subsequent refilling of concrete.

Device 61 includes a first support 65 and a second support 66. Support 65 will now be described it being understood that a similar description applies to support 66. Support 65 includes a right angle bracket 67 fixedly mounted atop an elongated member 68 pivotally mounted by fasteners 69 to frame 41. Elongated member 68 has a distal end portion 70 which extends toward shaker table 42 and extends downwardly beneath conveyors 51 and 52. Flange 71 is fixedly attached to elongated member 68 and in turn is connected to the extendable piston rod 72 of a hydraulic cylinder motor 73 mounted to frame 41. By extending piston rod 72, elongated member 68 and bracket 67 is caused to rotate in the direction of arrow 74 about fastener 69. Likewise, a second cylinder motor 75 is provided with an extendable piston rod connected to support 66 for pivoting bracket 77 in the direction of arrow 76.

Conveyors 51 and 52 direct molds 20 against the right angle bracket 67 of support 65 which then pivots upwardly simultaneously with the upward pivoting movement of support 66. Mold 20 is thereby lifted from a right-side-up position and in a horizontal plane to a vertical plane and to a position atop bracket 77 of support 66. With support 65 in a vertical and stationary position, support 66 is then pivoted downward in a direction opposite of arrow 76 carrying the mold 20 from the vertical plane to a horizontal plane in an upside-down position. That is, the open top of mold 20 now opens downwardly as support 66 is pivoted downward. The distal end portion 78 of support 66 now extends away from table 42 and beneath conveyors 80 and 81. A second pair of conveyors 80 and 81 (FIG. 1) are spaced apart to receive the upside-down positioned mold. The mold may then be removed from the concrete slotted floor.

Conveyors 51 and 52 are spaced apart a fixed distance less than the distance between conveyors 81 and 80. Conveyors 51 and 52 support the lower runners 24 and 25 of the mold whereas conveyors 80 and 81 support the concrete slotted floor produced by the mold. The solidified concrete floor having a metal framework therein possesses more strength than the box configured mold. Thus, the mold is supported with a pair of conveyors 51 and 52 located relatively close together whereas the concrete slotted floor is supported by conveyors 80 and 81 relatively far apart. The solidified concrete floor will not tend to sag in the middle as compared to the mold.

Figure 6:
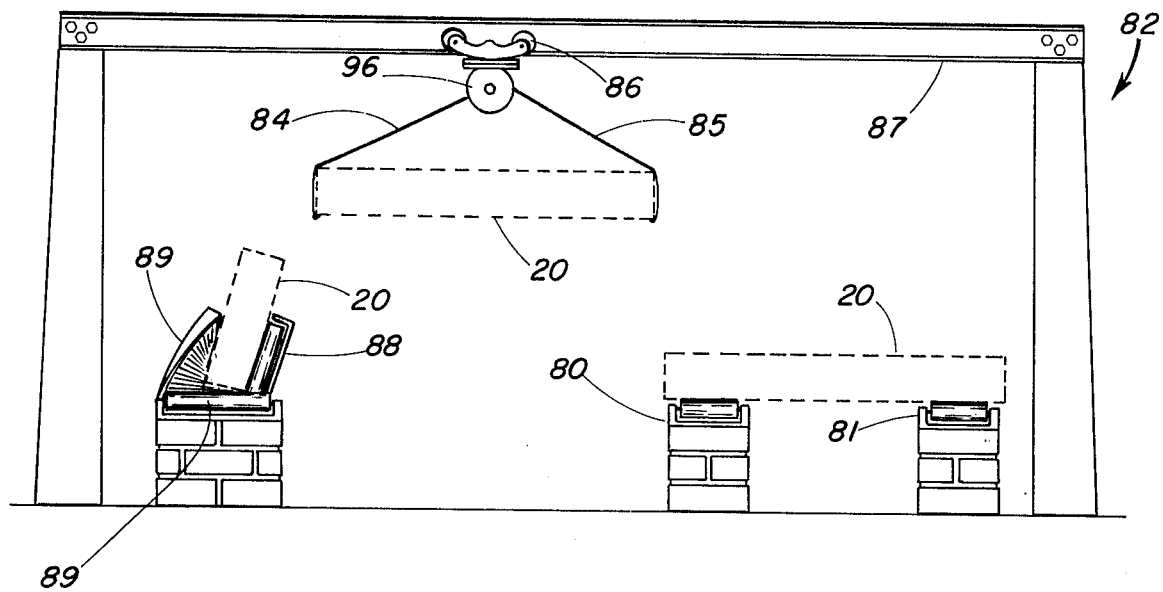
FIG. 6 is an end view of the apparatus of FIG. 5 looking in the direction of arrows 6—6.
Figure 9:
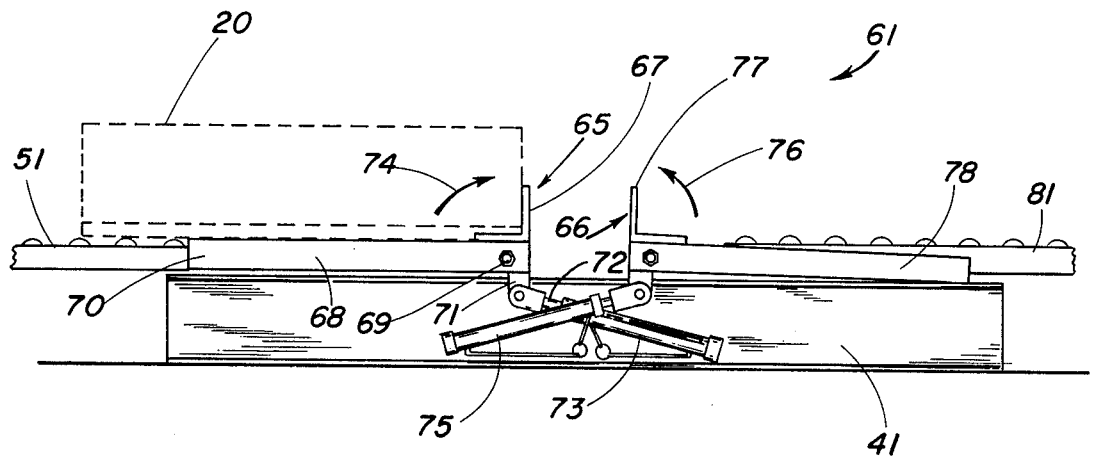
FIG. 9 is an enlarged cross-sectional fragmentary view taken along the line 9—9 of FIG. 5 looking in the direction of the arrows.

A hoist 82 is mounted across conveyors 80 and 81 and the return conveying means 83. Hoist 82 includes a pair of extendable cables 84 and 85 (FIG. 6) mounted to slide 86 engaged with runner 87. Slide 86 may be moved from atop conveyors 80 and 81 to a position atop return conveying means 83. Cables 84 and 85 are connectable to the mold by conventional fastening means secured to the mold. Cables 84 and 85 are mounted to wheel 96 which may be pivoted so as to rotate the mold with the length of the mold extending in the direction of arrow 97 (FIG. 5) when atop conveyors 80 and 81 to a position wherein the length of the mold extends in the direction of arrow 98 when positioned atop conveyor 89.

Figure 7:
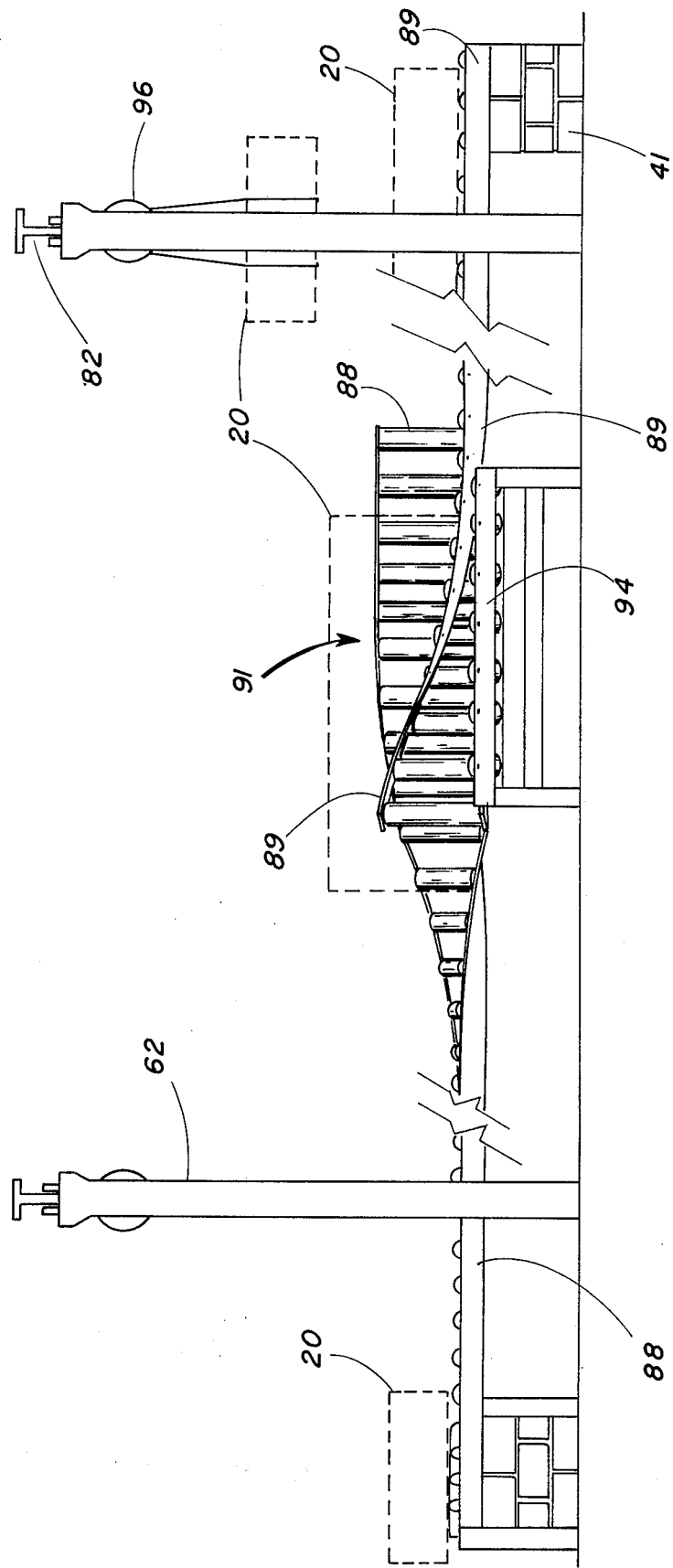
FIG. 7 is a side view of the apparatus of FIG. 5 looking in the direction of arrows 7—7.

Return conveying means 83 includes a pair of roller conveyors 88 and 89 mounted to frame 41. The mold is supported on its bottom surface by conveyor 89 when deposited thereon by hoist 82. The molds move across conveyors 51, 52 and 80, 81 with the width of each mold extending in the direction of travel whereas the molds return on conveying means 83 with the length of the molds extending in the direction of travel. The open top of each mold faces downwardly when hoist 82 removes the mold from atop conveyors 80, 81 to a position atop conveyor 89. It is therefore desirable to rotate the mold so as to move the mold back to the shaker table in a right-side-up condition. Conveyor 89 extends horizontally away from hoist 82 to convey the mold in a horizontal plane with conveyor 89 then twisting about return axis 90 (FIG. 5) at location 91 until conveyor 89 is located above conveyor 88 turning the mold right-side-up with the open top of the mold once again opening upwardly. Conveyor 88 starts (FIG. 7) from a non-horizontal position at the location where conveyor 89 starts to twist about the return axis 90. Conveyor 88 gradually assumes a horizontal position as the mold is rotated about the return axis so that the open top of the mold will move from an initial downward facing position to a final upward facing position. Eventually the mold will fall onto conveyor 88 from conveyor 89 with conveyor 89 terminating once the mold is adequately supported by conveyor 88. An optional conveyor 94 may be positioned beneath conveyors 88 and 89. Conveyor 94, or in the alternative, a horizontal shelf beneath conveyors 88 and 89 prevents the mold from slipping from between conveyors 88 and 89 as the mold is moved from an upside-down position to a right-side-up position.

An auxillary conveyor 92 (FIG. 5) then conveys the right-side-up mold back to the shaker table 42. A release agent dispensing means 93 is located adjacent return conveying means 83 being operable to force a release agent spray into the mold. Hoist 62 is identical to hoist 82 with the same description applying for hoist 82 as for hoist 62. Hoist 62 is provided for removing ribs 22 from mold 20 after the concrete has partially solidified but prior to the mold being turned over by device 61.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:
1. An apparatus for producing concrete floors comprising:
a main frame;
a mold for producing a concrete floor with a smooth top surface, said mold includes a bottom part with a smooth finish top surface extending thereacross to form said smooth top surface of said floor, said bottom part including a plurality of longitudinally extending ridges extending upwardly from said top surface, said bottom part includes a separate recess formed in said top surface between each of said ridges, each recess is concave and includes opposite longitudinally extending edge portions adjacent said ridges, said mold further includes a top part mounted atop said bottom part, said top part includes a pair of side walls and end walls connected together forming an enclosure for holding poured concrete, said mold includes spaced apart slab separators having an elongated configuration extending in the direction of said side walls, said separators are spaced from said end walls allowing concrete to extend completely around each separator forming integrally joined concrete slabs, each separator has a bottom end contacting said ridges of said bottom part and opposite side surfaces diverging from said bottom end allowing said separators to be withdrawn upon solidification of concrete within said mold and surrounding said separators, said mold further includes locating means on said mold to align said ridges with said separators;
a table movably mounted on said frame and adapted to receive and support said mold;
a source a flowable concrete positioned adjacent said table and having an outlet positioned over said mold directing concrete to flow from said source into said open top of said mold;
shaking means connected to and between said frame and said table and operable to shake said table and mold settling concrete within said mold;
first conveying means extending away from said table being sized to supportingly receive said mold and operable to convey said mold from said table to a first location;
mold turning over means located at said first location being sized to supportingly receive said mold from said first conveying means and operable to turn said mold upside-down with said open top facing downwardly; and,
second conveying extending toward said table, said second conveying means being sized and positioned to supportingly receive said mold when said mold is upside-down and operable to turn said mold right-side-up with said open top facing upwardly.

2. The apparatus of claim 1 wherein said first conveying means extends beneath said table and further comprising:
first lifting means engageable with said first conveying means at said table operable to lift said first conveying means until said mold is supported by said first conveying means and is spaced apart from said table.

3. The apparatus of claim 2 wherein:
said mold turning over means includes a first support and a second support pivotally mounted to said frame with said first support including a distal end portion normally directed toward said table and beneath said first conveying means and said second support including a distal end portion normally directed away from said table and beneath said first conveying means;
said mold turning over means includes power means mounted to said frame and connected to said first support and said second support operable to pivot said first support from beneath said first conveying means to above said first conveying means lifting said mold in a right-side-up position and rotating said mold from a horizontal plane to a vertical plane and to a position atop said second support and further operable simultaneously to pivot said second support toward said first support and to supportingly receive said mold and then next to pivot said second support downwardly away from said table further rotating said mold from a vertical plane to a horizontal plane atop said first conveying means in an upside-down position.

4. The apparatus of claim 3 wherein:
said power means includes a pair of cylinder motors mounted to said frame with said motors having extendable piston rods connected to said first support and said second support.

5. The apparatus of claim 2 wherein:
said table includes flexible supports adjacent said frame and said table allowing said table to vibrate apart from said frame;
said shaking means includes a motor mounted to said frame having a rotatable output shaft with a continuous belt engaged thereon, said shaking means further includes an eccentric rotatably mounted on said table engaged with said belt.

6. The apparatus of claim 2 and further comprising:
second lifting means operable to lift said mold from said first conveying means to said second conveying means; and wherein:
said first conveying means includes a first pair of conveyors spaced apart a first distance and extending from atop said shaking means to said mold turning over means, said first conveying means further includes a second pair of conveyors spaced apart a second distance greater than said first distance and extending from said mold turning over means to said second lifting means.

7. The apparatus of claim 6 wherein:
said second conveying means includes a first and second conveyor, said first conveyor extends horizontally away from said second lifting means carrying said mold in a horizontal plane with said first conveyor then twisting about a return axis from said horizontal plane through a vertical plane to a position adjacent said second conveyor transferring said mold to said second conveyor which is in a horizontal position, said second conveying means includes means operable to limit lateral movement of said mold relative to said first conveyor and said second conveyor.

8. The apparatus of claim 7 and further comprising:
means mounted adjacent said second conveying means operable to force a lubricating spray into said mold.

9. The apparatus of claim 8 wherein:
said mold turning over means includes a first support and a second support pivotally mounted to said frame with said first support including a distal end portion normally directed toward said table and beneath said first conveying means and said second support including a distal end portion normally directed away from said table and beneath said first conveying means;
said mold turning over means includes power means mounted to said frame and connected to said first support and said second support operable to pivot said first support from beneath said first conveying means to above said first conveying means lifting said mold in a right-side-up position and rotating said mold from a horizontal plane to a vertical plane and to a position atop said second support and further operable simultaneously to pivot said second support toward said first support and to supportingly receive said mold and then next to pivot said second support downwardly away from said table further rotating said mold from a vertical plane to a horizontal plane atop said first conveying means in an upside-down position.

10. The apparatus of claim 9 wherein:
said power means includes a pair of cylinder motors mounted to said frame with said motors having extendable piston rods connected to said first support and said second support;
said table includes flexible supports adjacent said frame and said table allowing said table to vibrate apart from said frame;
said shaking means includes a motor mounted to said frame having a rotatable output shaft with a continuous belt engaged thereon, said shaking means further includes an eccentric rotatably mounted on said table engaged with said belt.

11. A mold for producing a floor with a smooth top surface and having integrally joined concrete slabs for supporting animals comprising:
a bottom part with a smooth finish top surface extending thereacross to form said smooth top surface of said floor, said bottom part including a plurality of longitudinally extending ridges extending upwardly from said top surface, said bottom part includes a separate recess formed in said top surface between each of said ridges, each recess is concave and includes opposite longitudinally extending edge portions adjacent said ridges;
a top part mounted atop said bottom part, said top part includes a pair of side walls and end walls connected together forming an enclosure for holding poured concrete, said mold includes spaced apart slab separators having an elongated configuration extending in the direction of said side walls, said separators are spaced from said end walls allowing concrete to extend completely around each separator forming integrally joined concrete slabs, each separator has a bottom end positioned adjacent said ridges of said bottom part and opposite side surfaces diverging from said bottom end allowing said separators to be withdrawn upon solidification of concrete within said mold and surrounding said separators;
locating means on said mold to align said ridges with said separators, said locating means includes a plurality of clips positioned between said separators and said ridges, said clips being engaged with said separators and said ridges with said locating means being operable to allow release of said concrete to facilitate removal of said separators from said ridges.

* * * * *